W. A. PETERSEN.
ELECTRIC SCALE.
APPLICATION FILED JULY 24, 1917.
1,302,085.
Patented Apr. 29, 1919.
2 SHEETS—SHEET 1.
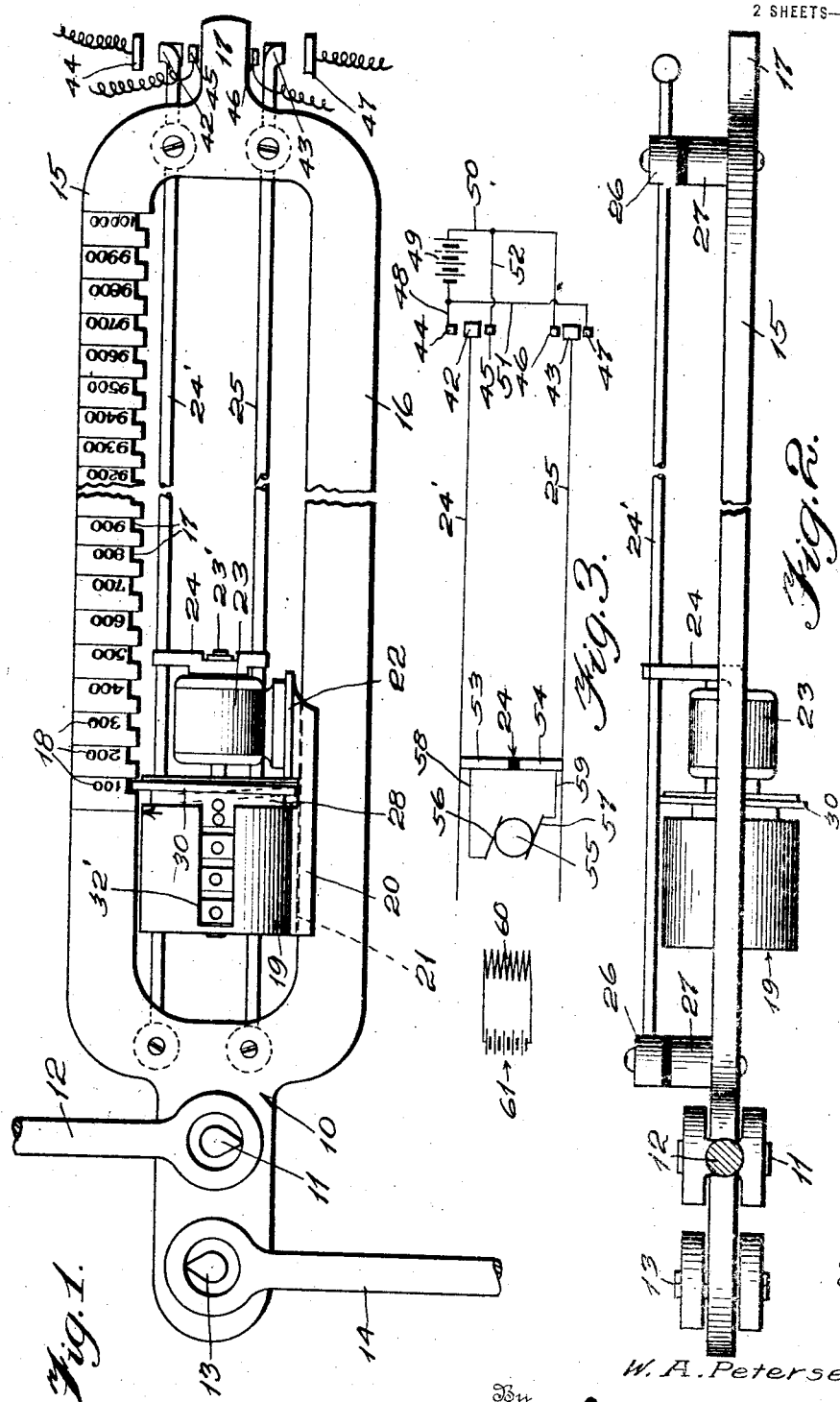
Inventor
W. A. Petersen
By C. L. Parker
Attorney W. A. PETERSEN.
ELECTRIC SCALE.
APPLICATION FILED JULY 24, 1917.
1,302,085.
Patented Apr. 29, 1919.
2 SHEETS—SHEET 2.
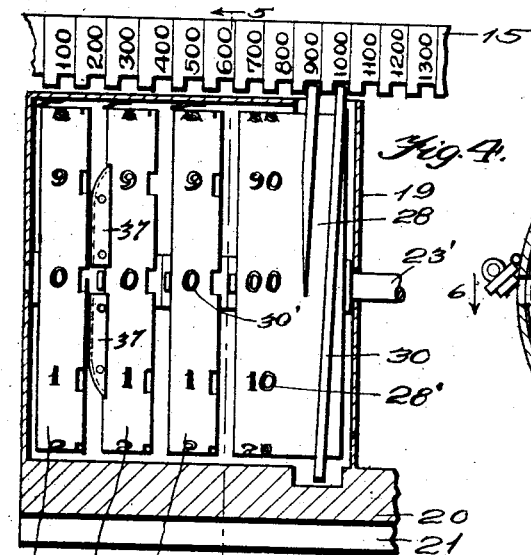
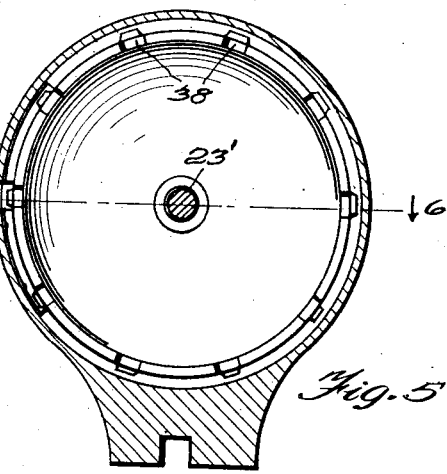
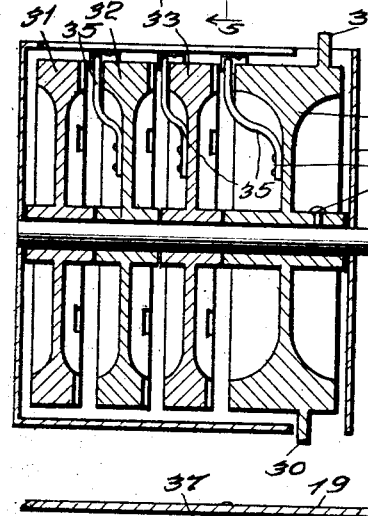
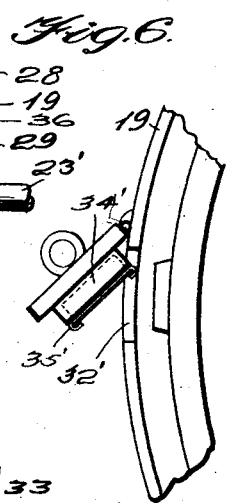
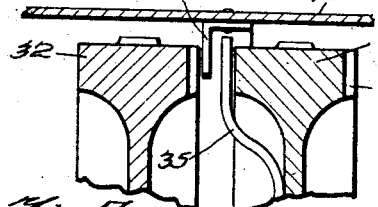
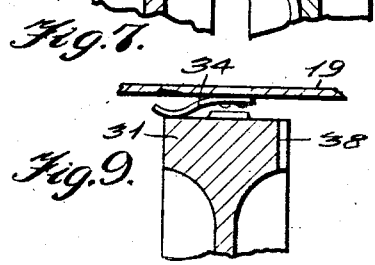
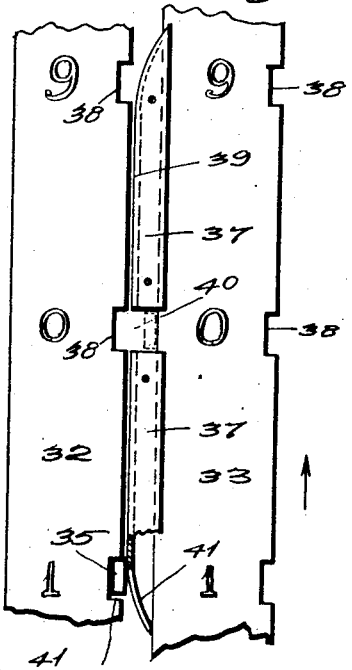
Inventor
W. A. Petersen,
By C. L. Parker.
Attorney

UNITED STATES PATENT OFFICE.

WILLIAM A. PETERSEN, OF EXCELSIOR SPRINGS, MISSOURI, ASSIGNOR OF ONE-HALF TO WILSON L. DOYLE, OF WHITEHALL, ILLINOIS.

ELECTRIC SCALE.

1,302,085.   Specification of Letters Patent.   Patented Apr. 29, 1919.

Application filed July 24, 1917. Serial No. 182,508.

*To all whom it may concern:*

Be it known that I, WILLIAM A. PETERSEN, a citizen of the United States, residing at Excelsior Springs, in the county of Clay and State of Missouri, have invented certain new and useful Improvements in Electric-Scales, of which the following is a specification.

My invention relates to improvements in scales, of the pivoted beam type.

An important object of the invention is to provide electrically operated means, which are automatically set into action upon the goods being placed upon or removed from the scale, for shifting the weight or weights, to weigh the goods and returning the weight or weights to the normal position, after the weighing operation is completed.

A further object of the invention is to provide reliable and simple means whereby a plurality of computing rolls may be turned, one by the other, for properly indicating the weight of the goods.

A further object of the invention is to provide apparatus of the above mentioned character, which is simple in construction, inexpensive to manufacture, strong and durable.

Other objects and advantages of the invention will be apparent during the course of the following description.

In the accompanying drawings forming a part of this specification and in which like numerals are employed to designate like parts throughout the same, Figure 1 is a side elevation of a scale beam and associated elements, embodying my invention, Fig. 2 is a plan view of the same, Fig. 3 is a diagrammatic view of the circuits included in the apparatus, Fig. 4 is a central vertical longitudinal section through the computing disk casing or drum, associated elements being shown in elevation, Fig. 5 is a transverse sectional view taken on line 5 of Fig. 4, Fig. 6 is a horizontal sectional view taken on line 6—6 of Fig. 5, Fig. 7 is an enlarged detail section through a plurality of the computing disks parts broken away, showing the lock actuating means, Fig. 8 is an enlarged side elevation of the lock actuating means, Fig. 9 is an elevation of brake means for the pivoted computing rolls, Fig. 10 is an end elevation of stamping means, and, Fig. 11 is a perspective view of a shifting track.

In the drawings, wherein for the purpose of illustration is shown a preferred embodiment of my invention, the numeral 10 designates a scale beam, having pivot elements 11, engaging a suspension member 12. The beam 10 is provided at its rear end with pivot elements 13, engaging a suspension member 14, extending downwardly for suitable connection with the load-carrying device, such as a platform, pan, or the like. The beam 10 has its forward portion in the form of spaced parallel bars 15 and 16, to the forward ends of which is connected an extension 17. The bar 15 is provided upon its lower edge with openings or notches 17, having reference characters 18, arranged adjacent thereto, and constituting a scale.

The numeral 19 designates a casing or drum, mounted to move longitudinally between the bars 15 and 16, and provided with a heavy base or casting 20, having a longitudinal slot 21 slidably receiving the upper edge of the bar 16, as shown. The drum or casing 19 has a portion 19' to coöperate with the scale of digits 18. The base 20 is extended in a forwardly direction beyond the drum 19, in an extension 22, upon which is rigidly mounted a motor 23. The armature shaft 23' of this motor is connected at its forward end with a contact device 24, slidably contacting with contact rods 24' and 25. These contact rods are secured in blocks 26, rigidly connected and insulated from blocks 27, which are in turn rigidly attached to the beam 10, as shown. It is thus apparent that the contact rods 24' and 25 are rigidly attached to the beam 10, but insulated therefrom.

The armature shaft 23', as more clearly shown in Figs. 4, 5, and 6, extends within and through the drum 19. Arranged upon the armature shaft 23', within the drum 19, is a propelling calculating roll 28, which is clamped thereto or rigidy secured to the same, as shown at 29. The propelling roll 28 is provided upon its periphery with a screw-thread 30, adapted to operate within the openings or notches 17, whereby the upper bar 15 functions as a stationary rack.

It is apparent that when the armature shaft 23' is rotated, the propelling calculating roll 28 is turned, which movement will effect a longitudinal travel of the base 20, and members carried thereby. Arranged within the casing or drum 19 are calculating rolls 31, 32, and 33, which are identical. Each of these rolls is pivoted upon the armature shaft 23', to turn with relation thereto.

The turning movement of each of the pivoted calculating rolls, is retarded, by means of a friction element or spring 34, contacting with the periphery thereof, and secured to the casing 19, as more clearly shown in Fig. 9.

Each of the rolls 28, 32, and 33 are provided with radially extending resilient lock devices or fingers 35, attached thereto, as shown at 36. The outer or free ends of the resilient lock devices or fingers project outwardy beyond the periphery of these rolls and are arranged in coöperative relation to stationary cam tracks or shifting devices 37. The rolls 31, 32, and 33 are provided with radially extending recesses or notches 38, each roll being provided with ten of such recesses or notches, equidistantly spaced.

The cam tracks or shifting devices 37 are longitudinally curved, stationary, and attached to the interior of the casing or drum 19. Each device 37 is provided with a shifting flange 39, which is spaced from the roll carrying the resilient finger 35. The flanges 39 are straight throughout the greater portion of their length and their inner ends are straight and spaced, providing a passage 40 therebetween, adapted for registration with the notch 38. The outer ends of the flanges 39 are separated from the body portion of the device 37 and is in the form of an inclined or angularly arranged resilient members 41, extending toward the roll carrying the resilient finger 35. Two of the devices 37 are employed in connection with each corresponding roll, for properly actuating the resilient finger 35, when the corresponding roll is rotated in opposite directions.

The roll 28 is the "tens" roll, the roll 33 the "hundreds" roll, the roll 32 the "thousands" roll and roll 31 the "ten thousands" roll. The roll 28 is provided with type 28' running from "00" to "90", while the rolls 31, 32, and 33 are provided with type 30' running from "0" to "9." When the "tens" roll 28 has made a complete revolution, the "hundreds" roll 33 is turned one step, for bringing the numeral "1" into view. When the "hundreds" roll 33 has made a complete revolution, the "thousands" roll 32 is advanced one step. When the "thousands" roll 32 has made a complete revolution the "ten thousands" roll is advanced one step.

The operation of the means for advancing one roll a step when the adjacent roll has made a complete revolution, will be readily understood from an inspection of Fig. 8. Assuming that the "tens" roll 28 is being turned in the direction of the arrow, in Fig. 8, the resilient lock finger 35 thereof is brought into contact with the inclined end 41 of the flange 39, and is shifted laterally to enter the adjacent recess 38 in the "hundreds" roll 33. It is thus apparent that the rolls 28 and 33 are now locked for rotation together, and the continued turning movement of the roll 28 will advance the roll 33 until the numeral "1" of the roll 33 assumes the active position, at which time the spring finger 35 is adjacent the passage 40. This finger being tensioned to move toward the roll 28, automatically moves into the passage 40, to assume a position inwardly of the flanges 39, thereby automatically unlocking the rolls 28 and 33. The continued turning movement of the roll 28 does not further rotate the roll 33, and the spring finger 35 is adapted to pass beneath the resilient extension 41 of the other track 37. As this operation occurs upon every complete revolution of the roll 28 it is obvious that the roll 33 is advanced a step for such complete operation. Upon the rotation of the roll 28 being reversed, the spring arm 35 contacts with the angularly arranged end 41 of the other track 37, and the roll 33 is turned a step in the opposite direction, for each complete revolution of the roll 28. It is believed that no further explanation of this operation is necessary except to state that the roll 32 is advanced by the roll 33 in a similar manner and the roll 31 turned in a similar manner by the roll 32.

Attention being called more particularly to Fig. 3, it will be seen that the contact rods 24' and 25 are provided at their ends with contact heads 42 and 43. The contact head 42 is adapted when moved upwardly to contact with a stationary contact 44, and when moved downwardly to contact with a stationary contact 45. The contact head 43 is adapted when moved upwardly to contact with a stationary contact 46, and to move downwardly to contact with a stationary contact 47. Connected with the stationary contact 44 is a wire 48, connected with one pole of the source of current 49, the opposite pole of which has connection with a wire 50, which is connected with the stationary contact 46. Connected with the same pole of the source of current 49 with the wire 48 is a wire 51, connected with the stationary contact 47. A wire 52 is connected with the stationary contact 45 and is connected with the same pole of the source of current 49 with the wire 50. The contact device 24 is formed in two insulated sections 53 and 54, having electrical contact with the rods 24' and 25 respectively.

The numeral 55 designates the armature of the motor 23 having contact brushes 56 and 57. The contact brush 56 is connected with the section 53 by a wire 58 and the brush 57 is connected with the section 54 by the wire 59. The numeral 60 designates the field of the motor, which is supplied with current from a separate source of current 61. It is to be understood that the invention is in no sense restricted to this precise arrangement of circuit, and I may employ a motor, the field of which is in shunt, series or compound winding with the armature. The type 28' and 30' are visible, through an opening 32', and a member 34' is pivoted near this opening, to move therein. The member 34' has devices 35' for the reception of a ticket. This device is adapted to move a ticket into contact with the type, whereby the weight is printed thereon, the beam 10 being then held against movement by any suitable means.

The operation of the apparatus is as follows:

When the goods are placed upon the platform or pan of the scale, the suspension member 10 is drawn downwardly which in turn swings the beam 10 upon its pivot 11, causing the forward end thereof to rise. The contact head 42 is now brought into contact with the stationary contact 44 and the contact head 43 into contact with the stationary contact 46. The circuit will be closed for causing the motor 23 to operate and its armature shaft 23', rotated clockwise. In this closed circuit, current flows from one side of the source of current 49, through wire 48, contact 44, contact 42, contact rod 24', section 53, wire 58, contact brush 56, armature 55, contact brush 57, wire 59, section 54, contact rod 25, contact 43, contact 46, and through the wire 50 back to the opposite pole of the source of current. Upon the rotation of the armature shaft 23 in a clockwise direction, the casing or housing 19 and the disks arranged therein, are advanced to the right, by the engagement of the screw-threads 30 within the opening or notches 17, until the beam 10 is balanced, the pointer 19' indicating the pounds in hundreds, by coöperation of the scale 18. The calculating disks 28, 31, 32, and 33, also indicate the weight of the goods in tens to ten thousands pounds. When the beam 10 is balanced, as above stated, the closed circuit is opened, by contact 42 being moved out of contact with the contact 44 and the contact 43 being moved out of contact by the contact 46. The goods having been weighed are removed from the scales, and the beam 10 will now drop to the lower position bringing contact 42 into contact with contact 45 and contact 43 in contact with contact 47. A circuit will now be closed to cause the armature shaft 23' of the motor 23 to revolve in an opposite direction, thereby returning the casing or housing 19 to the normal position, and the calculating disk therein, to the normal position. In this closed circuit, current flows from one pole of the source of current 49, through wire 51, contact 47, contact 43, contact rod 25, wire 59, contact brush 57, armature 55, contact brush 56, wire 58, section 53, contact rod 24', contact head 42, contact 45, and through wire 52 back to the opposite pole of the source of current. When the beam 10 again becomes balanced, this circuit will be opened, as is obvious.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a scale of the character described, the combination with a pivoted beam provided with a longitudinal set of notches, of a support adapted to slide longitudinally upon a portion of the pivoted beam, a roll pivoted to the support and provided with a screw-thread to operate within the notches of the beam, a motor secured to the support and having its armature shaft connected with the roll to turn it, means to cause the motor to operate in one direction when the pivoted beam is swung upwardly, and means to cause the motor to operate in an opposite direction when the beam is swung downwardly.

2. In a scale of the character described, the combination with a pivoted beam provided with a longitudinal set of notches, of a support adapted to slide longitudinally upon a portion of the pivoted beam, a driving calculating roll pivoted with the support and having a screw-thread to engage within the notches, a plurality of calculating rolls arranged near the driving calculating roll and pivotally connected with the support, means whereby one calculating roll turns the adjacent calculating roll, a motor carried by the support and connected with the driving calculating roll to turn it, means to cause the motor to operate in one direction when the pivoted beam is swung upwardly, and means to cause the motor to operate in an opposite direction when the beam is swung downwardly.

3. In a scale of the character described, the combination with a pivoted beam provided with a longitudinal set of notches, of a support mounted to slide longitudinally upon a portion of the pivoted beam, a motor secured to the support and having an armature shaft, a driving calculating roll rigidly mounted upon the armature shaft and having a screw-thread to operate within the notches, a second calculating roll pivoted upon the armature shaft near the driving calculating roll, means to connect and disconnect the calculating rolls, and means to cause the motor to operate in opposite directions.

4. In a scale of the character described, the combination with a pivoted beam provided with a longitudinal set of notches, of a support mounted to slide longitudinally upon a portion of the pivoted beam, a motor secured to the support and having an armature shaft, a driving calculating roll rigidly mounted upon the armature shaft and having a screw-thread to operate within the notches, a second calculating roll pivoted upon the armature shaft near the driving calculating roll, a lock element carried by the driving calculating roll and adapted for movement into contact with the second named calculating roll to connect the two rolls for rotation together, automatic means to shift the lock element to the active position upon the turning movement of the driving calculating roll for a predetermined distance, and means to operate the motor in opposite directions.

5. In a scale of the character described, the combination with a pivoted beam provided with a longitudinal set of notches, of a support mounted to slide longitudinally upon a portion of a pivoted beam, a casing carried by the support, a motor carried by the base and having an armature shaft extending into the casing, a driving calculating roll arranged within the casing and rigidly mounted upon the armature shaft and having a screw-thread to operate within the notches, a second calculating roll arranged within the casing and pivoted upon the armature shaft near the driving calculating roll, a lock element carried by the driving calculating roll and adapted for movement into contact with the second named roll, a relatively stationary track connected with the casing and adapted to shift the lock element to the active position, and means to cause the motor to operate in opposite directions.

6. In a scale of the character described, the combination with a pivoted beam, of a support disposed thereon to slide longitudinally thereof, pivoted calculating rolls carried by the support and provided with type for indicating the weight of the goods weighed, a housing connected with the support and surrounding the calculating rolls and provided with an opening, and a member pivotally connected with the housing for movement into and out of the opening and provided with a device for receiving and holding a ticket and adapted to bring the ticket into contact with the type.

In testimony whereof I affix my signature in presence of two witnesses.

WILLIAM A. PETERSEN.

Witnesses:
L. E. BATES,
F. M. KERN.

Copies of this patent may be obtained for five cents each, by addressing the "Commissioner of Patents, Washington, D. C."